Oct. 16, 1951     F. D. BONNIN     2,571,412

TANDEM AXLE SPRING SUSPENSION

Filed Aug. 23, 1947     2 Sheets-Sheet 1

INVENTOR:
FRED D. BONNIN
BY
Huebner, Maltby & Beehler
ATTORNEYS

Oct. 16, 1951 F. D. BONNIN 2,571,412
TANDEM AXLE SPRING SUSPENSION
Filed Aug. 23, 1947 2 Sheets-Sheet 2
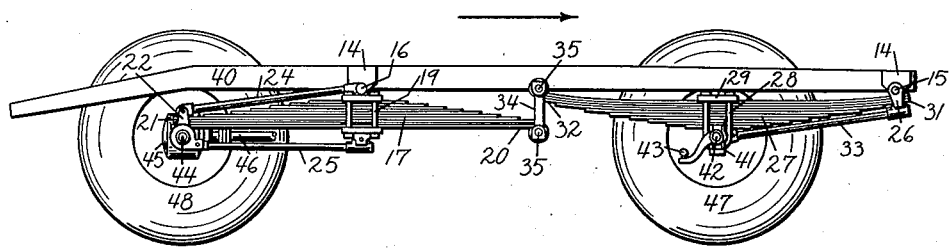
INVENTOR:
FRED D. BONNIN
BY
ATTORNEYS Patented Oct. 16, 1951

2,571,412

UNITED STATES PATENT OFFICE 2,571,412

TANDEM AXLE SPRING SUSPENSION

Fred D. Bonnin, Fresno, Calif.

Application August 23, 1947, Serial No. 770,240

3 Claims. (Cl. 280—104.5)

The present invention relates to tandem axle spring suspension and more particularly to spring suspension systems for load transporting devices.

It is a conventional practice to increase the capacity of load transporting devices by increasing the earth engaging surfaces of wheels employed to support the devices. This is generally accomplished by increasing the number of support wheels either by dual tire or tandem axle arrangements, or both. In tandem axle arrangements, the axles may be driving axles or merely support axles, but in both cases they are employed to accommodate additional wheels to increase the wheel traction and support surfaces. It is a practice to mount the axles transversely disposed to the normal direction of movement and in supporting relation to such load transporting devices. The axles are usually arranged as closely adjacent the wheels as the diameters of their respective wheels permit.

Trucks, trailers, wagons and the like have increased load capacity when equipped with tandem axles but experience concomitant effects generally considered objectionable. When the axles are mounted in supporting relation to a load transporting device by means of individual springs, said device is excessively rough riding. This is clearly apparent when it is considered that when the wheels of either axle ride over an encountered obstruction the resultant jarring of the axle is transmitted to the transporting device. Thus, the employing of tandem axles having independent spring suspension results in approximately twice the jarring of the load transporting device as normally experienced. Further, the independent spring suspending of tandem axles results in an imposing of substantially the entire load borne by both of the axles on a single axle when either of the axles are elevationally displaced by encountered elevations or depressions in terrain traversed. These difficulties have been partially overcome by mounting the tandem axles in unitary relation by means of interconnecting springs and by pivotally connecting the springs to a load transporting device for relative teetering movement. When the axles are so mounted, the application of braking action to the wheels journaled on the axles results in a tipping of the springs and the imposition of substantially all of the braking force on the wheels of the leading axle. This results in inefficient braking action and serious tire wear for the wheels of the leading axle. The forward tipping described frequently causes a hopping effect commonly known as chattering. Braking torque imposed on springs mounting tandem axles in unitary relation subject the springs to serious strain.

An object of the present invention is therefore to provide improved spring suspension for automobiles, trucks, trailers, wagons, and the like.

Another object is to provide a tandem axle suspension system conducive to smooth riding in load support devices.

Another object is to provide improved braking action in tandem axle suspension systems.

Another object is to provide a tandem axle suspension system for load transporting devices which may be conveniently repaired.

Another object is to provide in automobiles, trucks, trailers, wagons, and the like having a plurality of axles, spring mountings individual to the axles cooperatively absorbing shocks experienced by each axle.

Another object is to provide load equalizing spring mountings for a plurality of axles.

Another object is to provide tandem axle suspension for load transporting devices in which the tandem axles possess a wide range of individual elevational movement in adapting to terrain traversed while the load transporting device supported thereby maintains a substantially constant altitude.

Another object is to provide tandem axle suspension for load support means in which the tandem axles mount wheels having brakes, the suspension system automatically equalizing forces exerted downwardly on the axles by momentum of the load supported upon the application of the brakes.

In the drawings:

Fig. 6 is a side elevation of an automobile frame, conventional supporting axles, and the device of the present invention illustrative of the application of the device to automobiles.

Fig. 7 is a side elevation of a modified form of the present invention.

Fig. 8 is a side elevation of a further form of the present invention.

Figure 1:
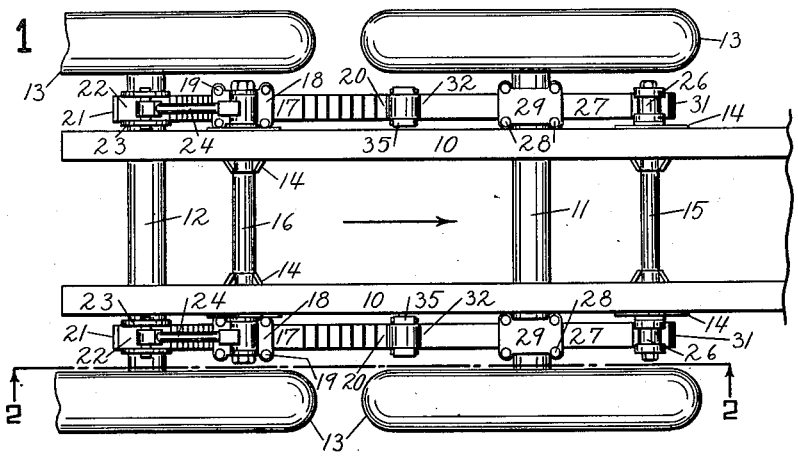
Fig. 1 is a plan view fragmentarily illustrating the suspension system of the present invention employed to mount a frame of a load transporting device on tandem axles having support wheels journaled thereon.
Figure 2:
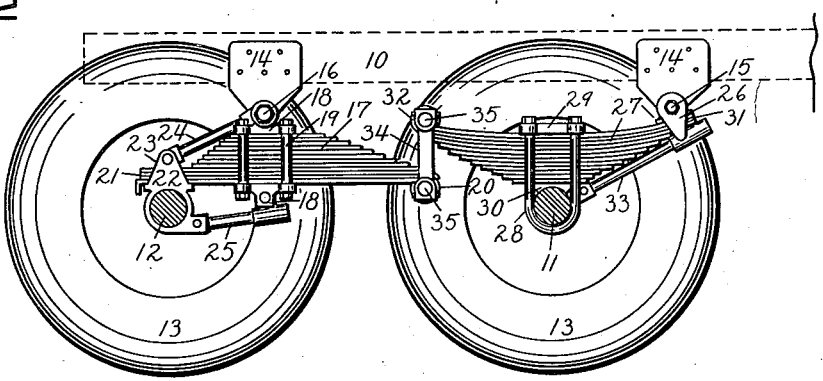
Fig. 2 is a side elevation of the tandem axles, wheels, frame, and suspension system shown in Fig. 1.

Referring in greater detail to the drawing:

A forwardly movable frame 10, illustrative of the frame of support devices such as trucks, trailers, wagons, and the like, employing tandem axles, is shown fragmentarily in Figs. 1 to 5 inclusively. A forward tandem axle 11 and a rearward tandem axle 12 are transversely disposed to the normal direction of movement of the frame 10 in adjacent spaced relation and have support wheels 13 journaled thereon in a conventional manner.

Spring hangers comprising frame brackets 14 and forward and rearward mounting shafts 15 and 16 respectively are mounted on the frame 10. The frame brackets are connected to the frame as by riveting and the mounting shafts are borne by the brackets in substantially parallel relation to the axles 11 and 12. The mounting shafts have end portions extended beyond the frame.

A pair of elongated rearward springs 17 are pivotally connected intermediate their end portions to the extended portions of the aft mounting shaft 16 in substantial alignment with the normal direction of movement of the frame 10. This is conveniently accomplished by spring mounting clamps 18 journaled on said shafts and having upper and lower portions held in gripping relation to the springs by means of bolts 19. Being in substantial alignment with the normal direction of movement of the frame, the springs have forwardly and rearwardly extended end portions 20 and 21, respectively. The forward end portions 20 are provided with transverse cylindrical openings adapted to receive shackle pins, as will presently be more fully described, and the rearward end portions 21 are configurated to provide downwardly disposed sliding surfaces and hooked end portions, as is commonly known in slipper springs. Support brackets 22 are mounted on the rearward axle 12 and provide upwardly disposed flanges 23 delineating channels slidably receiving the rearwardly disposed end portions 21 of the rearward springs 17. The axle 12 thus supports the rearward ends 21 of the rear springs. To maintain the support brackets in supporting relation to the springs 17 and yet to permit relative sliding movements during flexing of the springs, upper radius rods 24 are pivotally interconnected to upper portions of the brackets 22 and the mounting shaft 16 and lower radius rods 25 are pivotally interconnected to lower portions of said brackets and lower portions of the mounting clamps 18. So mounted, the axle 12 may be raised and lowered relative the frame 10 while maintained in constant sliding support relation to the spring 17.

Slide shackles 26 are pivotally mounted on the extended end portions of the forward mounting shaft 15 in dependent position. Forward springs 27 are secured to the forward axle in substantial alignment with the rearward springs 17 by any suitable means such as U bolts 28 and upper and lower spring clamping members 29 and 30, respectively. The mounting of the forward springs on the forward axle 11 is essentially conventional and is thus not explained in greater detail. The forward springs, being in substantial alignment with the normal direction of movement of the load transporting device, have forward and rearward extended end portions conveniently designated at 31 and 32, respectively. The forward end portions 31 are slidably received by the slide shackles 26 in supporting relation to the frame 10. Forward radius rods 33 pivotally interconnect portions of the slide shackles below their respective springs and the lower spring clamping members 30 in fixed spaced relation.

The rearward end portions 32 of the forward springs 27 are provided with shackle pin openings of conventional form. The springs 17 and 27 are preferably arranged in substantial alignment so as to have adjacent elevationally spaced end portions. Load dividing shackles 34 employing shackle pins 35 are interconnected to each of the rearward end portions 32 of the forward springs 27 and the forward end portions 20 of their respective aligned rearward springs 17 in predetermined spaced relation. It is to be understood that the springs 17 and 27 may take any convenient elongated form resiliently resisting forces tending longitudinally to bend or flex the same. It has been found preferable, however, to employ an upwardly concaved leaf spring as the rearward spring 17 and a downwardly concaved leaf spring as the forward spring 27.

Figure 3:
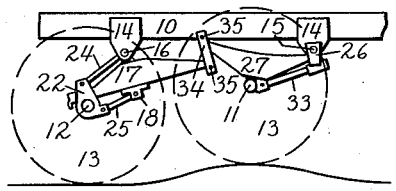
Fig. 3 is a schematic diagram illustrating the operation of the suspension system of the present invention showing the leading wheels thereof raised in traversing elevated terrain.
Figure 4:
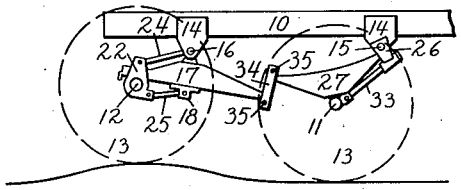
Fig. 4 is a schematic diagram illustrating the traversing of elevated terrain by rear wheels of the tandem axle suspension system of the present invention.
Figure 5:
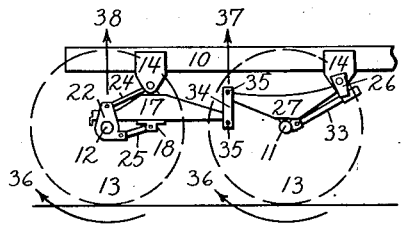
Fig. 5 is a schematic diagram employing vectors to illustrate the action of forces within the suspension system of the present invention upon the application of braking action to the wheels thereof.

The operation of the spring suspension system of the present invention is clearly apparent in the preceding description and is more fully illustrated in the schematic diagrams of Figs. 3, 4, and 5. In Fig. 3, the forward support wheels 13 and the forward axle 11 are shown in raised position as in traversing elevated terrain. The forward springs 27 readily accommodate themselves to the elevating of the forward axle by pivoting upwardly about the slide shackles 26 as fulcrums. The rearward end portions 32 of the forward springs, being connected to the forward end portions 20 of the rearward springs 17, raise said forward end portions of the rearward springs in response to the elevating of the axle 11. The rearward springs 17, being pivotally connected to the rearward mounting shaft 16, have the rearward end portions 21 thereof depressed by the raising of the forward end portions 20. Thus, it is seen that as the forward wheels are elevated, the load supported by the frame 10 is automatically distributed between the forward and the rearward support wheels through the interconnected forward and rearward springs.

In Fig. 4, the attitudes of elements of the suspension system of the present invention, as positioned in accommodating elevating of the rearward wheels 13 and the axle 12, are illustrated. When the rear axle 12 is raised, the rearward end portions 21 of the rearward spring 17 are similarly raised, the rearward springs are tipped to lower the forward end portions 20 thereof, and the load dividing shackles 34 depress the rearward end portions 32 of the forward springs 27. This clearly maintains predetermined distribution of loads supported by the frame 10 between the forward and rearward axles 11 and 12 and results in a substantially constant load being supported by each wheel independent of variations in the elevations of the axles.

When the frame 10 is moving forward and a braking action is applied to the wheels 13, torque forces represented by the vectors 36 in Fig. 4 are imposed on the wheels. It is clearly apparent that the torque forces 36 tend to pivot the forward springs 27 clockwise about the forward mounting shaft 15 and tend to pivot the rearward springs 17 clockwise about the rearward mounting shaft 16. Resultant upwardly directed forces are experienced at the rearward end portions 32 of the forward springs, as shown by vector 37, and similar upward forces are experienced at the rearward end portions 21 of the rearward springs, as illustrated by the vector 38. Through the teetering action of the rearward springs 17, the forces represented by the vector 38 are transmitted to the load dividing shackle 34 to oppose the forces represented by vector 37. Thus, when braking action is applied to the wheels 13, the springs of the present invention employ the torque effects in opposition and maintain the loads borne by the wheels in substantially constant relationships. Forward tipping of conventional tandem axle spring suspension systems and resultant imposition of concentrated forces on the forward axle and wheels, as experienced upon the application of the brakes, is avoided. To shift greater braking load to the rearward springs 17 they are pivotally mounted slightly aft of their mid points to provide forces acting on the forwardly extended end portions 20 thereof with greater mechanical advantage or leverage than opposing forces exerted on the rearwardly extended end portions 21.

All of the elements of the suspension system of the present invention are conveniently accessible. By removing the shackle pins 35 from the load dividing shackles 34 and by disengaging the mounting clamps 18 from the rearward mounting shaft 16, the rearward wheels 13, axle 12, and springs 17, may be conveniently removed and trundled from under the frame 10. Somewhat similarly, the forward wheels 13, axle 11, and springs 27 may be removed from under the frame by removing the shackle pins 35, disconnecting an end of each radius rod 33, and by disengaging the forward springs 27 from their slide shackles 25.

The loads imposed on the suspension system of the present invention are divided between the rearward and forward axles in predetermined amounts and are maintained in substantially constant distribution during operation. The suspension system imparts smooth riding characteristics to load transporting devices. The axles possess a wide range of freedom of elevational movement without displacing the frame from normal operational position. Both the forward and rearward springs absorb shocks experienced by either or both of the axles. The distribution of the torsional effect of braking action between the forward and rearward axles results in a dependable braking effect heretofore unknown in tandem axle suspension systems. Tire wear experienced by the wheels 13 is equalized, resulting in tire economy. Maintenance and repair of the spring suspension system is conveniently and economically accomplished through the ready accessibility of the parts thereof.

The tandem axles need not be spaced as closely adjacent as the diameters of wheels journaled thereon permit but may be spacially related in response to the functions to be performed and employ the suspension system of the present invention. This is demonstrated in Fig. 6 wherein a forwardly movable frame of an automobile is indicated generally at 40. The automobile employs a front axle 41 of the usual form mounting outwardy disposed spindles 42, positioned by guide arms 43 in the usual manner. A rear axle 44 having a differential 45 and a drive shaft 46, also of conventional form, is shown. Front wheels 47 are journaled on the spindles 42 and rear wheels 48 journaled on the rear axle 44. As shown in Fig. 6, a rear wheel and a front wheel have been removed to reveal the application of the device of the present invention to the spaced axles. The suspension system is interposed between the axles 41 and 44 respectively and the frame 40 in the manner already described; the front axle 41 being mounted intermediate the end portions of the springs 27 by the U bolts 28 and the clamping members 29 and the rear axle 44 being mounted in the support brackets 22 slidably receiving the rearwardly disposed end portions 21 of the rear spring 17. At this point, it is clearly evident that the lengths of the springs 17 and 27 are selected in relation to the spacing of the axles on which the frame of an automobile, truck, trailer, wagon, and the like is to be supported.

*Modification*

A modified form of the present invention is illustrated in side elevation in Fig. 7. The frame 40, front wheels 47, spindles 42, front axle 41, guide arm 43, rear wheel 48, and rear axle 44 of Fig. 6 are again shown in Fig. 7. Pivot brackets 50, somewhat similar to frame brackets 14 are mounted on the frame 40 as by riveting, welding, or other suitable means and downwardly extended therefrom. A pair of pivot brackets are preferably mounted near the forward end portion of the frame 40 and a second pair of pivot brackets mounted intermediate the end portions of said frame. Forward suspension arms 52 are pivotally mounted on the forward pivot brackets 50 and rearwardly extended therefrom in substantial alignment with the normal direction of movement of the frame 40. Rearward suspension arms 53 are pivotally mounted near their mid-portions on the rearward pivot brackets 51 in substantial alignment with the forward suspension arms. The forward suspension arms 52 are rearwardly extended and the rearward suspension arms 53 forwardly extended to adjacent overlapping relation. Said adjacent end portions of the suspension arms are pivotally connected in fixed spaced relation by load dividing shackles 54 engaged to said end portions of the suspension arms by shackle pins 55. The front axle 41 is mounted near the mid-portions of the forward suspension arms by means of U-bolts 56 and clamping plates 57. The U-bolts conveniently embrace the front axle and extend upwardly through the clamping plates 57, which are positioned in overlying relation to the forward suspension arms. The U-bolts and clamping plates are conveniently secured by means of nuts 58 screw-threadedly engaged to the U-bolts. The clamping plates are configurated to provide upwardly disposed spring receptacles, as at 59. The rear axle 44 is conveniently mounted on the rearwardly disposed end portions of the rearward suspension arms by means of U-bolts 60, clamping plates 61, having upwardly disposed spring receptacles 62 formed therein, and nuts 63 similar to the bolts 56, clamping members 57, receptacles 59, and nuts 58 already described. Substantially cylindrical spring receptacle members 64 are mounted on the frame 40 in depending position juxtaposed to the upwardly disposed spring receptacles 59 and 60 respectively. Helical compression springs 65 are interposed between the downwardly disposed spring receptacles and their cooperatively employed upwardly disposed receptacles 59 and 62. So mounted, the spring 65 resiliently support the frame 40 and load carried thereby on the axles 41 and 44. The suspension arms through their pivotal interconnection by means of the shackles 54 divide supported loads between the forward and rearward axles achieving the smooth riding characteristics already described. The helical springs 65 through the suspension arms achieve the cooperative absorption of bumps and jars experienced by the wheels 47 and 48 in the manner of the leaf springs 17 and 27.

*Further modification*

The frame 40, front axle 41, spindles 42, guide arms 43, front wheel 47, rear axle 44 and rear wheel 48 previously described are again shown in Fig. 8. The front axle and the rear axle are spaced in the usual manner. Rearward frame brackets 70, medial frame brackets 71, and forward frame brackets 72, similar to the frame brackets 14 already described; are mounted longitudinally spaced on the frame 40 as shown in Fig. 8. Rearward leaf springs 73, medial leaf springs 74, and forward leaf springs 75 are pivotally mounted near their mid-portions on the brackets 70, 71, and 72, respectively, by means of clamping bolts 76 and clamps 77, similar to bolts 19 and clamps 18, respectively. The leaf springs are preferably arranged in alignment with the normal direction of movement of the frame 40 and with each other and are provided with over-lapping end portions. The rearward spring 73 is provided at its rearwardly disposed end portion with a hook 78 similar in shape to the rearward end portion 21 of the spring 17 previously described. The adjacent end portions of the rearward, medial, and forward springs are provided with shackle pin receptacles 80 of the usual form. Said adjacent end portions of the springs are interconnected in fixed spaced relation by load dividing shackles 81 secured to said adjacent end portions by means of shackle pins 82. As shown in Fig. 8 the forward and rearward leaf springs are conveniently upwardly concaved and the medial leaf springs preferably downwardly concaved. Rear axle supporting brackets 83, similar to the support brackets 22 previously described, are mounted on the rear axle 44 and slideably receive the rearward end portions of the rearward springs 73, being maintained in supporting relation to said springs by the hooks 78. The front axle is mounted in supporting relation to the forwardly extended end portions of the forward springs 75 by means of U-bolts 84 and clamps 85 in over-laying relation to the forward ends of said springs. The U-bolts are conveniently passed around the axle 41 and extended upwardly through the clamp 85 and there secured by nuts 86.

This form of the present invention possesses the attributes previously described. The weight of the frame 40 and load borne thereby are distributed between the wheels 47 and 48 as said wheels are raised and lowered in traversing uneven terrain. Shocks and jars experienced by any of the wheels are absorbed by the forward, medial, and rearward springs through the action of the load dividing shackles 81.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. In a load transporting device having a frame supported by fore and aft tandem axles, a suspension system interposed between the axles and frame comprising forward and rearward elongated spring means in substantial fore and aft alignment and having adjacent end portions, shackles pivotally interconnecting the adjacent end portions of the spring means, forward shackle means borne by the frame and slidably receiving the forward end portions of the forward springs in supporting relation to the frame for relative pivotal and slidable movement, tension means pivotally interconnecting the forward shackle means and the forward axle, rearward hangers mounted on the frame and pivotally supported by the rearward spring means near the mid portions thereof, clamps mounting transversely of the frame one of the axles on the forward spring means near the mid portions of said means, and radius rods connecting the rearward hangers and the aft axle in fixed spaced relation, said axle being retained thereby in slidable supporting relation to the rearward end portions of the rearward spring means.

2. In a load dividing suspension system for a forwardly movable load transporting device, the combination of a plurality of upwardly concaved leaf springs pivotally mounted on the transporting device and having end portions forwardly and rearwardly extended from such mounting, a plurality of downwardly concaved leaf springs connected to the forward end portions of the upwardly concaved springs and forwardly extended therefrom, slide shackles mounted on the transporting device and maintaining the forwardly extended end portions of the downwardly concaved springs in slidable supporting relation to said load transporting device, a forward axle in supporting relation to the downwardly concaved springs near the mid portions thereof and transversely disposed to the load transporting device, radius rods pivotally connected to the slide shackles and to the forward axle, a rearward axle transversely disposed to the load transporting device in slidable supporting relation to the rearwardly extended end portions of the upwardly concaved springs, and radius rods pivotally connected to the load transporting device and to the rearward axle and maintaining said axle in spring engagement.

3. In a shock absorbing mechanism for motor vehicles having a frame and tandem pairs of wheels mounted on a forward and an aft axle transversely disposed to the frame, a suspension system at each side of the vehicle each comprising forward and rearward elongated springs in substantial fore and aft alignment and having adjacent end portions, a shackle pivotally interconnecting the adjacent end portions of the springs, a forward shackle borne by the frame and slidably receiving the forward end of the forward spring in supporting relation to the frame, a radius rod pivotally interconnecting the forward shackle and the forward axle, a rearward hanger mounted on the frame and pivotally supported by the rearward spring near the mid-portion thereof, a supporting bracket mounted on the aft axle and slidably supporting the rearward end portion of the rearward spring a radius rod pivotally interconnecting the supporting bracket and the rearward hanger and a clamp mounting the forward spring in supported relation on the forward axle at the mid-portion of said spring.

FRED D. BONNIN.

REFERENCES CITED

The following references are of record in the file of this patent:

UNITED STATES PATENTS

| Number | Name | Date |
|---|---|---|
| 1,685,295 | Rodin | Sept. 25, 1928 |
| 1,702,809 | Brown | Feb. 19, 1929 |
| 1,757,759 | Van Leuven | May 6, 1930 |
| 1,841,709 | Buquor | Jan. 19, 1932 |
| 1,946,060 | Buckendale | Feb. 6, 1934 |
| 1,989,746 | Farris | Feb. 5, 1935 |
| 2,508,634 | Ziegler | May 23, 1950 |